Sept. 9, 1958  C. C. ZAVODA  2,851,315
BREATHING BEARING-SEAL
Filed June 17, 1954
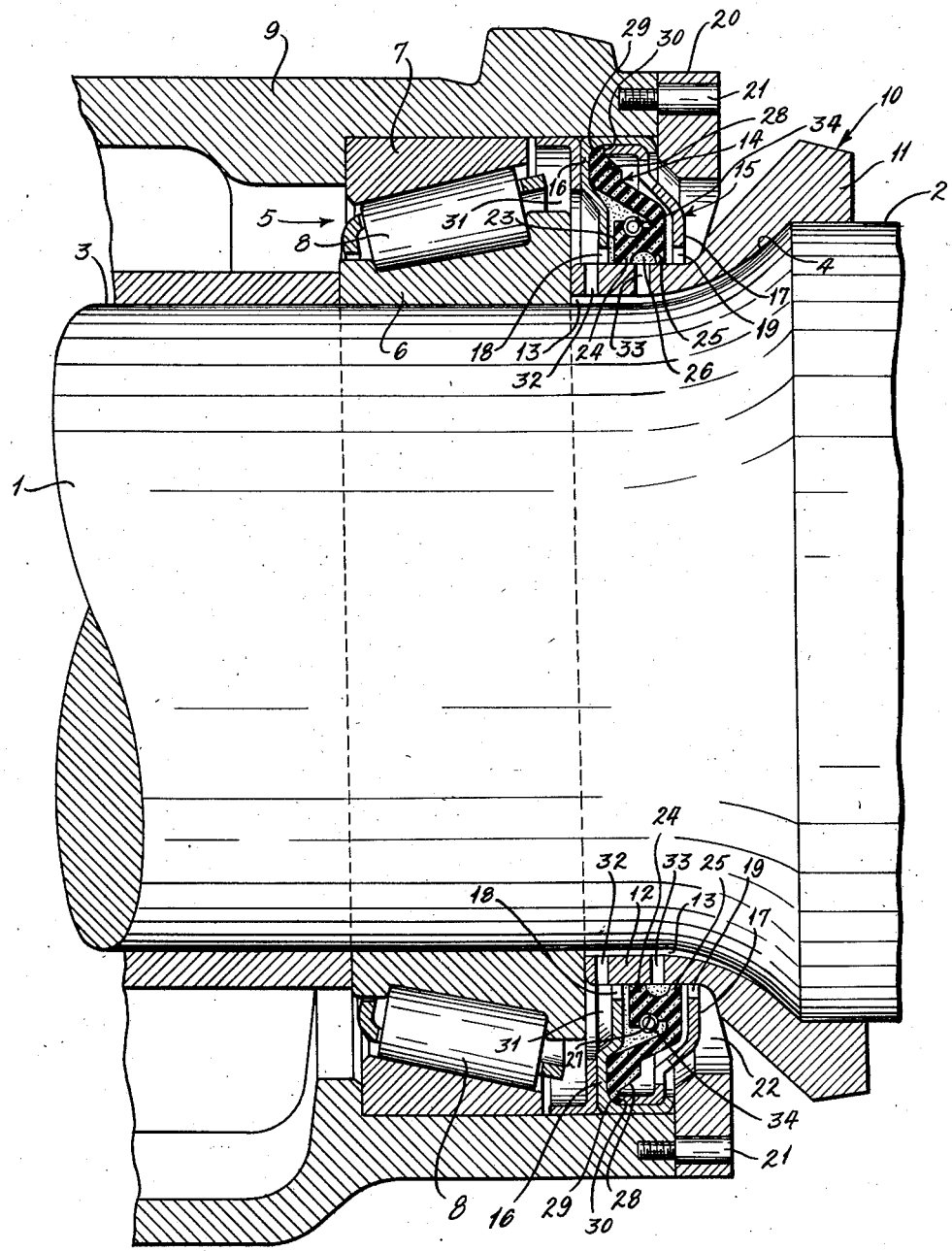
INVENTOR:
CLARENCE C. ZAVODA
By Gravely, Tiedler, Woodruff & Wills
ATTORNEYS.

United States Patent Office 2,851,315
Patented Sept. 9, 1958

2,851,315

BREATHING BEARING-SEAL

Clarence C. Zavoda, Canton, Ohio, assignor to The Timken Roller Bearing Company, Canton, Ohio, a corporation of Ohio Application June 17, 1954, Serial No. 437,333

6 Claims. (Cl. 308—187.1)

This invention relates generally to the bearing art, and is more particularly directed to a breathing bearing-seal which will allow the passage of air from the bearing housing without permitting the entrance of dirt and moisture.

Various means have been devised for sealing bearings to prevent the entrance of foreign elements and to retain the lubricant within the bearing housing, but under increased pressure and temperature the lubricants leak out of the bearings and dirt and moisture enter, thereby causing increased friction and wear, and consequently reducing the efficiency and life of the bearing.

The principal object of the present invention is to provide a novel breathing bearing-seal which facilitates the passage of air from the bearing chamber without permitting the lubricant to escape therefrom.

Another object is to provide a seal for a bearing which will permit the passage of air from the bearing, but prevent the entrance of foreign matter.

These and other objects and advantages will become apparent hereinafter.

The invention is embodied in an improved breathing seal for a bearing housing, comprising a cone backing ring having openings therein and positioned on a shaft so as to have one end portion spaced therefrom, and a resilient seal mounted on the cone backing ring and having a pair of spaced flanges forming a cavity which is in radial alignment with openings in the cone backing ring, thereby providing an integral circuitous passageway from the bearing, through the openings, and into the cavity, The invention also consists in the parts, elements, and combinations of parts hereinafter described and claimed. In the accompanying drawing, which forms part of this specification and wherein like numerals refer to like parts wherever they occur:

Fig. 1 is a vertical cross-sectional view of a breathing bearing-seal embodying the present invention.

Throughout the detailed description, various elements and parts will be axially located by reference to their position relative to the bearing, i. e. "inwardly" meaning nearer the bearing, and "outwardly" meaning farther from the bearing with respect to other parts and elements. Therefore, when looking at the drawing the right side thereof will be considered "outwardly" axially with respect to the bearing.

For the purpose of this disclosure, the invention is illustrated as applied to a rotatable axle 1, which includes a large end 2 and a reduced end 3 with a shoulder 4 therebetween. Mounted on the reduced end 3 is a tapered roller bearing 5 having an inner race 6 and an outer race 7, and a plurality of tapered rollers 8. Enclosing the outer race 7 of the bearing 5 is a bearing housing 9.

A cone backing ring 10 having an end portion 11 mounted on the large end 2 and the shoulder 4 of the axle 1, and a sleeve portion 12 which is constructed and positioned to provide a space 13 between it and the reduced end 3 of the axle 1.

The invention includes the cone backing ring 10 and a resilient sealing member 14, which is mounted within a casing 15 having an inner wall 16 and an outer wall 17. The inner wall 16 of the casing 15 is positioned axially outwardly of the bearing 5, and the radially inner edges of both the inner and the outer walls 16 and 17 are spaced from the sleeve portion 12 of the cone backing ring 10 providing apertures 18 and 19, respectively, therebetween. The outer edges of the inner and outer walls 16 and 17 overlap and are immediately adjacent to the inner surface of the bearing housing 9.

The casing 15 is maintained and positioned relative to the bearing by a seal backing plate 20 which is secured to the bearing housing 9 by bolts 21, the seal backing plate 20 extending radially inwardly adjacent the outer wall 17 of the casing 15 so as to provide apertures 22 between the seal backing plate 20 and the end portion 11 of the cone backing ring 10.

The resilient sealing member 14 includes a body portion 23 having an inwardly extending inner sealing flange 24 and an inwardly extending outer sealing flange 25 spaced axially therefrom, both of said flanges being in slidable contact with the sleeve portion 12 of the cone backing ring 10. A cavity 26 is formed between the inner and outer sealing flanges 24 and 25. Formed in the outer face of the body portion 23 is an annular groove 27, which is axially offset from the cavity in the direction of the inner flange 24 and has a spring 34 positioned therein, the function of which will be described hereinafter. Further comprising the resilient sealing member 14 is an outer portion 28, which extends diagonally radially outwardly and axially inwardly from the outer face of the body portion 23. The outer edge of the outer portion 28 contains a convex arcuate surface 29 which is positioned on a co-extensive concave arcuate surface formed in the inner wall 16 of the casing 15, and is retained in abutting relation therewith by a flange 30 provided on the outer portion 28 of the resilient sealing member 14, said flange 30 abutting the upper edge of the outer wall 17 of the casing 15.

A chamber 31 is provided adjacent the bearing 5 and inwardly of the inner wall 16 of the casing 15, and is filled with lubricant from the bearing housing 9. The portion of the sleeve 12 which forms the radially inner wall of the chamber 31, contains a series of inner openings 32 which provide passageways between the chamber 31 and the space 13. Located axially outwardly from the inner openings 32 are a series of outer openings 33 in the sleeve portion 12, which are in radial alignment with the cavity 26 formed between the inner and outer sealing flanges 24 and 25 of the resilient sealing member 14, thereby extending the passageway to the cavity 26.

The inner and outer sealing flanges 24 and 25 are maintained in operating relationship with the sleeve portion 12 of the cone backing ring 10 by the inward pressure exerted by the spring 34 upon the body portion 23 of the resilient sealing member 14. However, because the annular groove 27 and spring 34 are offset axially inwardly of an imaginary plane extending radially through the center of the cavity 26, the pressure exerted radially inwardly on the outer sealing flange 25 pressing it against the sleeve portion 12 is less than the force on the inner sealing flange 24.

During operation of the axle 1, heat is generated causing the expansion of air within the bearing housing 9. The expanding air follows the passageway from the lubricant chamber 31 inwardly through the inner openings 32 in the sleeve portion 12 of the cone backing ring 10 and into the space 13, then outwardly through the outer openings 33 into the cavity 26 between the inner and outer sealing flanges 24 and 25, thereby exerting an outward pressure on the inner face of the outer sealing flange 25.

As the internal pressure within the cavity 26 increases, the rubbing pressure of the outer sealing flange 25 against the sleeve portion 12 of the cone backing ring 10 decreases, whereas the rubbing pressure of the inner sealing flange 24 is maintained by the comparatively stronger pressure exerted by the spring 34. When the pressure of the outer sealing flange 25 against the sleeve portion 12 is overcome by the internal pressure within the sealing arrangement, the outer flange 25 is moved away from the sleeve portion 12 thereby deforming the outer portion 28 of the resilient sealing member 14 and permitting the air to pass from the cavity 26. The air then escapes into the atmosphere through the apertures 19 in the outer wall 17 of the casing 15 and the openings 22 in the seal backing plate 20. When the pressure within the cavity 26 is reduced, the forces exerted by the deformed outer portion 28 and the spring 34 against the body portion 23 of the resilient sealing member 14 moves the outer sealing flange 25 back into sealing engagement with the sleeve portion 12 thereby preventing the entrance of dirt or moisture into the cavity 26.

The centrifugal force developed by the rotating axle 1 and cone backing ring 10 acting on the lubricant contained in chamber 31 prevents it from clogging the inner openings 32 of the sleeve portion 12, thereby maintaining a free passageway from the chamber 31 to the cavity 26 between the inner and outer sealing flanges 24 and 25.

Although the embodiment of the invention illustrated comprises a rotating axle 1 seated in an appropriate housing, it should be understood that the sealing arrangement would operate just as efficiently if the axle 1 were stationary and the housing rotated, as in a wheel. The only difference between the two analogous constructions is the effect of the centrifugal force upon the lubricant. Thus, when the axle 1 rotates, the lubricant is thrown out of the openings 32 in the cone backing ring 10, whereas when the housing rotates the lubricant remains in the outer portion of the lubricant chamber 31 and never approaches the openings 32 in the cone backing ring 10, except possibly when the wheel is at rest.

This invention is intended to cover all changes and modifications of the example of the invention herein chosen for purposes of the disclosure, which do not constitute departures from the spirit and scope of the invention.

What I claim is:

1. A sealing construction for a bearing mounted on a shaft, comprising a backing ring having an end portion adapted to be mounted on the shaft and a sleeve extending inwardly therefrom in spaced relation with the shaft to form a cavity therebetween; a casing for a sealing member adapted to be positioned adjacent to the bearing; a resilient sealing member positioned within said casing and having flanges in axially spaced relation forming a cavity therebetween, said flanges being positioned in slidable contact with the sleeve, an outer opening formed in the sleeve in communication with the cavity between said flanges, and an inner opening in said sleeve axially spaced from said outer opening inwardly of said resilient sealing member, said openings and cavities providing a circuitous passageway from the bearing to the cavity between said flanges.

2. In combination, a bearing mounted on a shaft and enclosed by a bearing housing; a backing ring having an end portion mounted on said shaft and a sleeve extending axially inwardly from said end portion and spaced from said shaft to form a cavity therebetween; casing means extending between said bearing housing and said sleeve adjacent to said bearing, said casing means having opposed walls spaced from said sleeve to form apertures therebetween; a resilient sealing member positioned within said casing means and having flanges in axially spaced relation forming a cavity therebetween, said flanges being positioned against the sleeve in slidable contact therewith; an outer opening in the sleeve in communication with the cavity formed between said flanges; and an inner opening in said sleeve axially positioned from the outer opening inwardly of said resilient sealing member, said openings and cavities forming a circuitous passageway from said bearing to the cavity between said flanges.

3. A sealing construction for a bearing mounted on a shaft and enclosed by a bearing housing; said sealing construction comprising a backing ring having an end portion adapted to be mounted on a shaft and a sleeve extending axially inwardly therefrom in spaced relation with the shaft to form a cavity therebetween; casing means adapted to be positioned adjacent to the bearing; a resilient sealing member mounted in said casing means having an outer portion positioned thereagainst and a body portion containing an inwardly extending inner flange and an inwardly extending outer flange forming a cavity therebetween, said flanges being positioned against said sleeve in slidable contact therewith; means yieldably maintaining said flanges in sliding contact with the sleeve; an outer opening in said sleeve in communication with the cavity formed between said flanges; and an inner opening in the sleeve axially positioned from said outer opening inwardly of said resilient sealing member, said openings and cavities forming a circuitous passageway from said bearing to said cavity between said flanges.

4. A sealing construction for a bearing mounted on a shaft, comprising a backing ring having an end portion mounted on the shaft with a sleeve extending axially inwardly in spaced relation to the shaft to form a cavity therebetween; a casing for a sealing member positioned adjacent to said bearing; a resilient sealing member positioned within said casing and having a body portion with an inner flange and an outer flange positioned in slidable contact with said sleeve, said flanges being in axially spaced relationship to provide a cavity therebetween; an annular groove formed in the outer surface of said body portion; spring-like means positioned in said annular groove exerting an inward pressure against said body portion maintaining said flanges in operating engagement with said sleeve, said annular groove and said spring being offset axially inwardly of said cavity so as to exert a lesser pressure on the outer sealing flange than upon the inner sealing flange whereby an increased pressure within the cavity will cause a movement of the outer flange away from the sleeve; an outer opening formed in the sleeve in communication with the cavity formed between said flanges; and an inner opening formed in said sleeve axially positioned from said outer opening inwardly of said resilient sealing member, said openings and cavities providing a circuitous passageway from said bearing to the cavity between said flanges.

5. A sealing construction for a bearing mounted on a shaft, comprising a backing ring having an end portion mounted on the shaft with a sleeve extending inwardly therefrom and spaced from the shaft to form a cavity therebetween; a casing positioned adjacent to the bearing and containing a resilient sealing member therein having a body portion containing an inwardly extending inner flange and an inwardly extending outer flange forming a cavity therebetween, said flanges being positioned against said sleeve in slidable contact therewith, said resilient sealing member also having an outer portion extending diagonally radially outwardly and axially inwardly from the outer face of the body portion and positioned against the said casing in abutting relationship therewith, said outer face of the body portion also having an annular groove therein containing spring-like means for yieldably maintaining the flanges in operating position; an outer opening formed in the sleeve in communication with the cavity formed between said flanges; and an inner opening in said sleeve axially positioned from said outer opening inwardly of said resilient sealing member, said openings and cavities providing a circuitous passageway from the bearing to the cavity between said flanges.

6. In combination, a bearing having an inner raceway and an outer raceway, said bearing being mounted on a shaft and enclosed by a bearing housing and having a chamber immediately adjacent thereto positioned inwardly of said bearing housing; a backing ring having an end portion mounted on said shaft with a sleeve extending axially inwardly therefrom and spaced from said shaft to form a cavity therebetween, said sleeve having an inner edge in abutting relation to said inner raceway, an inner opening in the sleeve in communication with said chamber, an outer opening in said sleeve spaced axially outwardly of said inner opening; a casing positioned between the bearing housing and said sleeve defining the outer wall of said chamber, said casing having opposed walls spaced from said sleeve to form apertures therebetween; a resilient sealing member positioned within said casing axially outwardly of the inner opening in said sleeve and having a body portion and an outer portion, said outer portion being positioned against said casing in abutting relationship therewith, the body portion of the sealing member including an outer surface containing an annular groove and an inner surface having an inner flange and a outer flange extending inwardly therefrom forming a cavity therebetween, said flanges being positioned against said sleeve in slidable contact therewith and so as to position said outer opening in said sleeve in radial alignment with the cavity formed between said flanges, said annular groove being offset axially inwardly of said cavity, and spring-like means positioned in said groove yieldably maintaining the flanges in operating position.

References Cited in the file of this patent

UNITED STATES PATENTS

| | | |
|---|---|---|
| 2,241,870 | Scribner | May 13, 1941 |
| 2,657,104 | Kayser | Oct. 27, 1953 |

FOREIGN PATENTS

| | | |
|---|---|---|
| 554,331 | Great Britain | June 29, 1943 |
| 699,653 | Great Britain | Nov. 11, 1953 |
| 1,024,718 | France | Jan. 10, 1953 |